United States Patent [19]

Cason, Jr. et al.

[11] 3,914,612

[45] Oct. 21, 1975

[54] NEUTRON SOURCE

[75] Inventors: John L. Cason, Jr., Birmingham, Ala.; Carl B. Shaw, Richland, Wash.

[73] Assignee: The United States of America as represented by the United States Energy Research and Development Administration, Washington, D.C.

[22] Filed: Aug. 26, 1974

[21] Appl. No.: 500,790

[52] U.S. Cl. .................................. 250/499; 250/518
[51] Int. Cl.² .......................................... G21G 4/02
[58] Field of Search .................... 250/499, 500, 518

[56] References Cited
UNITED STATES PATENTS

| | | | |
|---|---|---|---|
| 3,659,106 | 4/1972 | Cason | 250/518 |
| 3,816,742 | 6/1974 | Besant | 250/499 |

*Primary Examiner*—Davis L. Willis
*Attorney, Agent, or Firm*—Dean E. Carlson; Arthur A. Churm; Frank H. Jackson

[57] ABSTRACT

A neutron source which is particularly useful for neutron radiography consists of a vessel containing a moderating media of relatively low moderating ratio, a flux trap including a moderating media of relatively high moderating ratio at the center of the vessel, a shell of depleted uranium dioxide surrounding the moderating media of relatively high moderating ratio, a plurality of guide tubes each containing a movable source of neutrons surrounding the flux trap, a neutron shield surrounding one part of each guide tube and at least one collimator extending from the flux trap to the exterior of the neutron source. The shell of depleted uranium dioxide has a window therein provided with depleted uranium dioxide shutters for each collimator. Reflectors are provided above and below the flux trap and on the guide tubes away from the flux trap.

10 Claims, 4 Drawing Figures

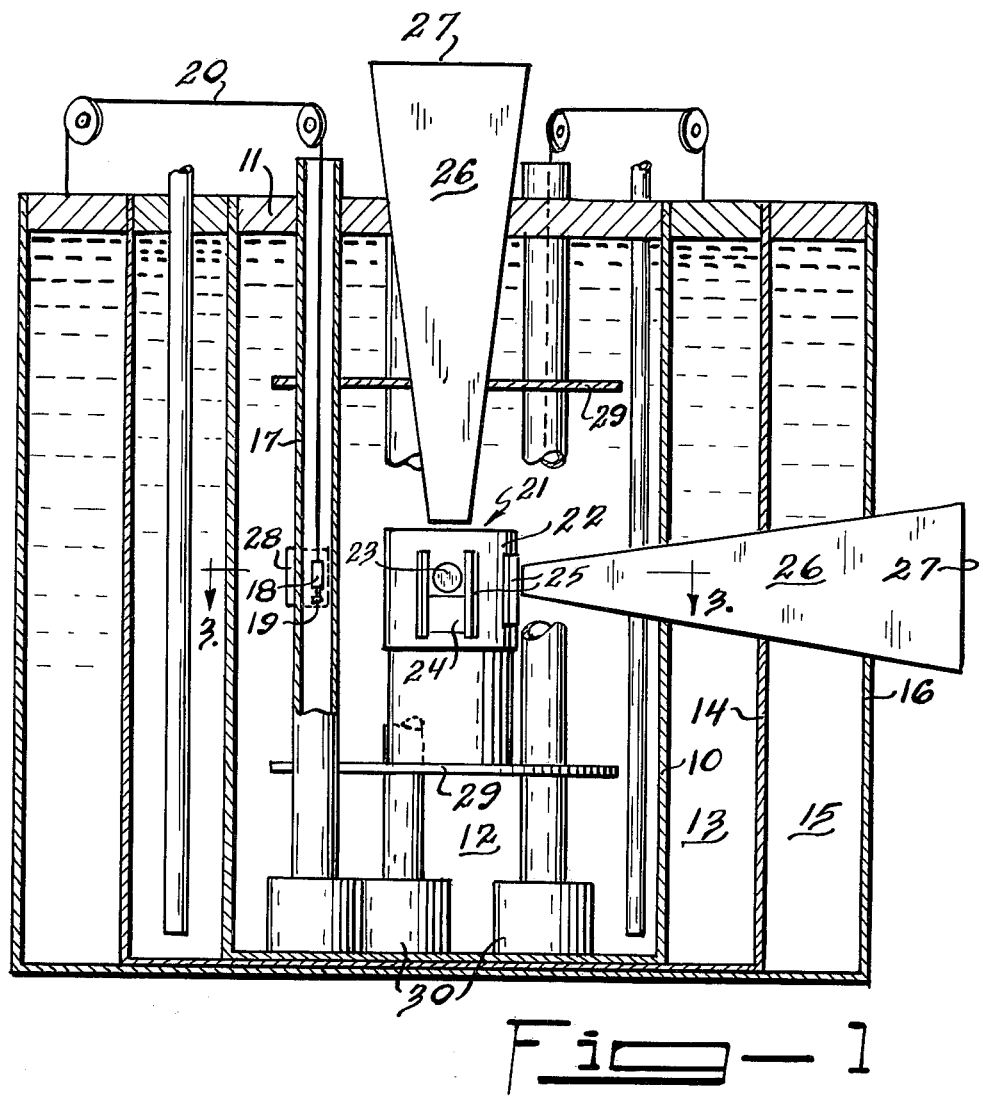
Fig—1
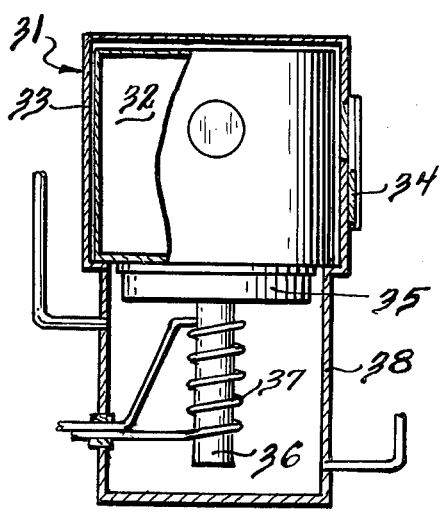
Fig—4

NEUTRON SOURCE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates in general to an economical neutron source. In more detail, the invention relates to an isotopic neutron source particularly useful in neutron radiography.

There are three broad categories of neutron sources available for neutron radiography:
1. Nuclear reactors
2. Neutron generators and
3. Isotopic neutron sources.

Nuclear reactors are most widely used and for some purposes are essential since it is not possible to obtain such an intense beam of thermal neutrons in any other way. Nuclear reactors are, of course, fixed in place and very expensive and accordingly are not adapted to be used in all situations where radiography would be a useful tool in industry.

Neutron generators wherein thermal neutrons are produced by moderating high-energy neutrons obtained by bombarding a target with ions from an accelerator are also useful. The cost, simplicity and transportability of such generators cover a range between reactor sources and small isotopic sources.

The third major method of generating thermal neutrons is with an isotopic source. Such sources may use a radioisotope which emits alpha or gamma radiation in conjunction with a material which emits neutrons when bombarded by such radiation; for example, beryllium in conjunction with a radioisotope of americium, antimony, californium, plutonium, polonium or radium. Of all isotopic sources presently available, however, californium-252 — which undergoes spontaneous fissioning with a half-life of 2.65 years, emitting neutrons in the process — provides the most intense source of neutrons and a portable neutron source employing californium-252 is described in U.S. Pat. No. 3,659,106, dated Apr. 25, 1972. The primary criterion with respect to the patent design was portability and, in attaining portability, many desirable features were sacrificed. Thus, there still remains a demand for a neutron source incorporating californium-252 which is economical to build and to operate, has great versatility and, while not truly portable, is of such size it can be moved if this is necessary or desirable.

SUMMARY OF THE INVENTION

The neutron source of the present invention consists of a vessel containing a moderating media, a flux trap including a moderating media of high moderating ratio at the center of the vessel the moderating ratio of the first mentioned moderating media being lower than that of the moderating media in the flux trap, a shell of depleted uranium dioxide surrounding the moderating media of high moderating ratio, a plurality of guide tubes each containing a movable source of neutrons surrounding the flux trap, a neutron shield surrounding one part of each guide tube and at least one collimator extending from the flux trap to the exterior of the neutron source.

BRIEF DESCRIPTION OF THE DRAWINGS

The invention will next be described in connection with the accompanying drawing wherein:

FIG. 1 is a diagrammatic vertical section of a neutron source according to the present invention, FIG. 4 is a vertical view of a modification thereof.

As shown in FIGS. 1 and 2, a cylindrical, inner vessel 10, provided with a cover 11, contains a body 12 of moderating material of relatively low moderating ratio such as mineral oil. Vessel 10 may be, for example, constructed of aluminum 0.63 inch thick and is 1.0 meter O.D. and 2.4 meters high. Concentrically disposed thereabout are a fast neutron shield 13 constituted of light water poisoned with gadolinium oxide contained within an intermediate stainless-steel vessel 14 and a biological shield 15 constituted of light water or other shielding material contained within an outer stainless-steel vessel 16. Vessel 14 is 1.4 meters O.D. and 2.4 meters high, while vessel 16 is 1.83 meters O.D. and 2.4 meters high.

Figure 2:
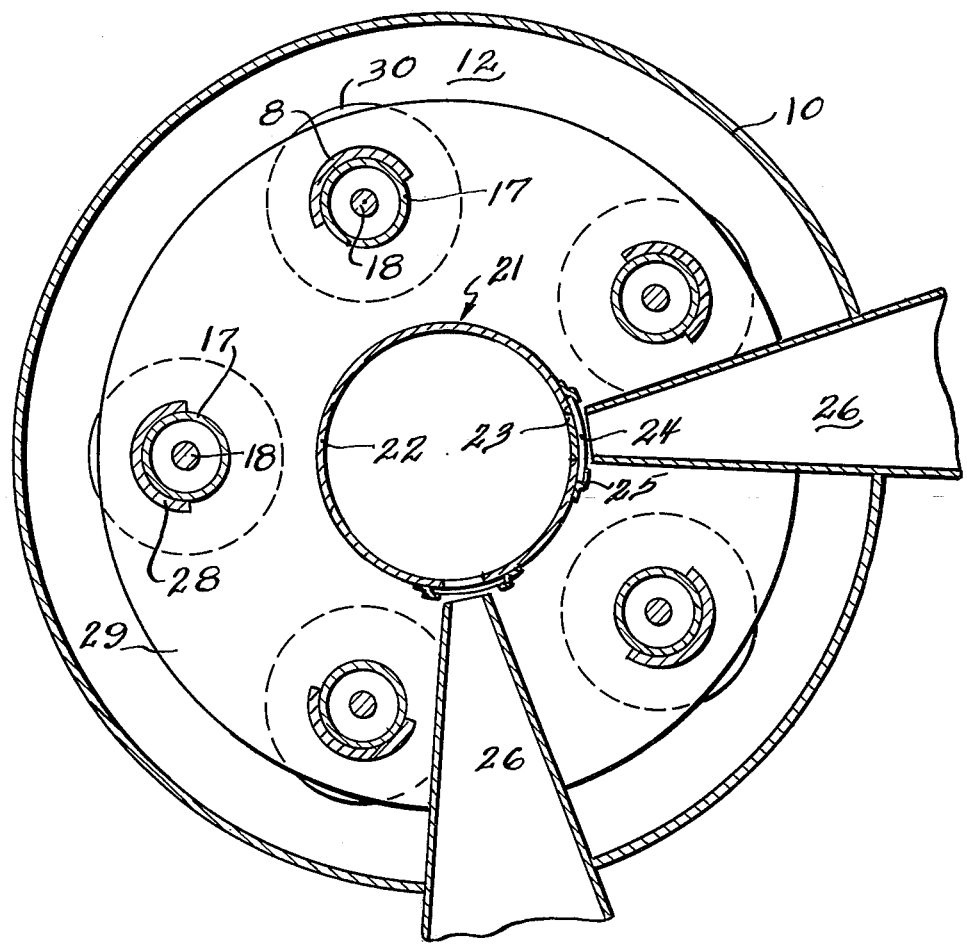
FIG. 2 is a horizontal section taken in the direction of the arrows 3—3 in FIG. 1.

A plurality of magnesium or aluminum guide tubes 17 are disposed in the inner vessel 10 around the central axis of the vessel and parallel thereto. They preferably should be equidistant from the central axis and from each other. Five such are shown, although this is not necessarily the optimum number. Movably disposed in each of guide tubes 17 is a capsule 18 — to which is attached counterweight 19 — containing 2 milligrams of californium-252. Other sources of neutrons could possibly be used; however, californium-252 is much to be preferred since it is effectively a point source emitting a very large number of neutrons with no interference from gamma radiation from the source. Capsules 18 are moved in a vertical direction by motors (not shown) operating through cables 20. Guide tubes 17 are 2.6 meters high with an I.D. 3 mm larger than capsule 18 (approximately 0.9 cm in I.D. with a wall thickness of 0.3 cm).

At the center of inner vessel 10 a flux trap 21 is created by a body of moderating material of relatively high moderating ratio such as heavy water enclosed within a shell 22 formed of depleted uranium dioxide — 0.22% enriched in U-235 — which is 25.4 cm high and 15.4 cm in O.D. with a 1.28 cm thick wall and has three 3.0 diameter and 1.28 cm thick magnesium windows 23 therein. Two of the windows are in the side of the canister at a 90° angle with respect to each other and the other is in the top of the canister. Each window 23 is provided with a shutter 24 — also formed of depleted uranium dioxide — which is movable in slots 25 to cover the window or leave the window open. The depleted uranium dioxide serves both as a gamma screen and to interact with neutrons to add to the neutron population. The moderating material may be changed to tailor the neutron spectrum for the desired purpose.

Three orthogonally disposed collimators 26 extend from windows 23 to beam ports 27 outside of outer vessel 16. Collimators 26 are essentially conventional in nature, consisting of a stainless-steel plug lined with a cadmium, boral or boron carbide with epoxy liner (not shown). One horizontal collimator is 1.0 meter long with a 2.5 cm square inlet aperture and a 30.0 cm square outlet aperture, while the other horizontal collimator is 1.0 meter long with a 1.0 cm square inlet aperture and a 20 cm square outlet aperture. The vertical collimator is 1.3 meters long with a 3.0 cm square inlet aperture and a 30.0 cm outlet aperture. Although three collimators are included, only one should be used when maximum efficiency is required, since a multi-collimator system suppresses the total neutron flux available.

An arcuate reflector 28 consisting of one-half of a right cylinder formed of zirconium hydride is disposed on the side of each guide tube 17 away from the flux trap 21 and at the elevation of the windows 23 in canister 22. These reflectors are 2.5 cm thick and 4.0 cm high. Also included are horizontally disposed upper and lower reflector plates 29 formed of zirconium hydride backed by uranium dioxide disposed above and below the flux trap. Upper and lower reflector plates are 0.4 cm thick, 30.4 cm in diameter and are 30.4 cm apart, equidistant from the flux trap. In addition, guide tube neutron shields 30 are provided surrounding the lower portion of guide tubes 17. Shields 30 are right cylinders 15.4 cm in diameter formed of depleted uranium dioxide or lead. It is thus possible to drop any or all of capsules 18 into their respective shields, thus effectively shutting down the apparatus. It is also possible to close shutters 24, thus cutting one or more collimators off from the flux trap.

Figure 3:
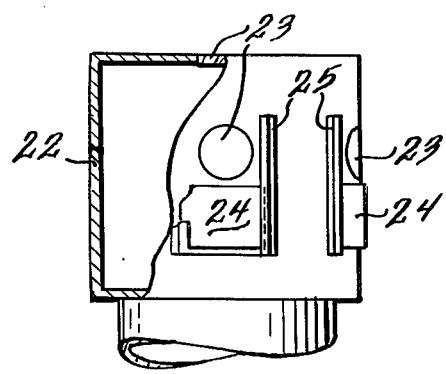
FIG. 3 is an enlarged vertical view partly in section of the flux trap shown in the center of FIG. 1.

FIG. 4 illustrates a modified flux trap in which temperature control thereof can be employed to change the mean energy of the neutrons. According to this modification, a double-walled magnesium or aluminum dewar 31 containing heavy water 32 is surrounded by a shell 33 of depleted uranium dioxide provided with shutters 34 as in FIG. 3. As shown, a metal block 35 provided with a depending metal finger 36 is fastened to the bottom of dewar 31 and serves as a heat sink or chill block depending on whether heating or cooling of the flux trap is being accomplished. Finger 36 may be heated by an electrical heating coil 37 wound there around or may be cooled by introducing a liquified gas such as liquid nitrogen into the casing 38 surrounging metal block 35 and finger 36. Insulation of the heavy water 32 in the flux trap from the surrounding moderating media by use of dewar 31 makes it possible to cool the heavy water to below 77°K., thus increasing the moderating efficiency by 20 % at 77°K.

A neutron beam filtering capability may be provided by positioning a screen holding carriage across each collimator. This carriage allows screens of cadmium, beryllium or other materials to be positioned directly in the neutron path. The screens are contained in an inert atmosphere (nitrogen) and provision for cooling and heating them would be provided. Additional possible modifications include the use of fully enriched uranium dioxide or plutonium dioxide to boost the total neutron flux. Thus encapsulated pellets of plutonium dioxide could be utilized in the guide tubes along with californium-252. Fissioning of the plutonium is accomplished by the neutrons from the californium. Also encapsulated uranium dioxide could be incorporated in other guide tubes or in the core of the flux trap where it would boost total peak thermal flux from the trap. Also plutonium and uranium dioxide combinations may be utilized in regions of thermal flux to utilize fissioning of uranium dioxide to initiate fissioning of plutonium, thus boosting the efficiency of the total system.

The device as thus described is particularly useful for neutron radiography, particularly since it permits of push-button operation. The unique nature of the source array, containment, moderation, collimation and shielding permits economic radiographic exposures, using small quantities of californium-252, of irradiated and nonirradiated specimens.

There are numerous applications which the device could be used for which include:
1. Neutron activation analysis.
2. Neutron gaging.
3. Neutron/gamma radiography.
4. Basic neutron physics studies, i.e., time-of-flight, neutron diffraction.
5. Neutron enhanced alpha autoradiography of fuels.

The applications listed above would require minor modifications to the device as presented in the preceding disclosure. These modifications can be typified as follows:
1. Providing a "rabbit" loop through the flux trap for maximum efficiency or beam utilization.
2. Special beam plug allowing for high resolution collimation of neutron beam producing small "point" source at output of beam.
3. Removal of bismuth gamma filters from beam allowing high gamma to neutron ratio.
4. Installation of small chopper or crystal diffractometer on high resolution neutron beam.
5. Same as neutron radiography.

The embodiments of the invention in which an exclusive property or privilege is claimed are defined as follows:

1. A neutron source comprising a vessel containing a moderating media, a flux trap containing a moderating media of high moderating ratio at the center of said vessel, the moderating ratio of the first mentioned moderating media being lower than that of the moderating media in the flux trap, a shell of depleted uranium dioxide surrounding the moderating media in the flux trap, a plurality of guide tubes in said vessel distributed uniformly around the flux trap and equidistant therefrom, a source of neutrons within each of said guide tubes, a neutron shield surrounding a portion of each of said guide tubes, means for moving said sources of neutrons from a position adjacent the flux trap to a position within the neutron shield, and collimator means defining at least one neutron beam path from the flux trap to the exterior of the neutron source.

2. A neutron source according to claim 1 wherein said sources of neutrons are capsules containing californium-252.

3. A neutron source according to claim 1 wherein said moderating media of high moderating ratio is heavy water and said moderating media of lower moderating ratio is mineral oil.

4. A neutron source according to claim 3 wherein the flux trap is enclosed within a dewar vessel and including means for heating and cooling the heavy water within the dewar vessel.

5. A neutron source according to claim 4 and including a fast neutron shield consisting of water poisoned with gadolinium oxide surrounding said vessel and a biological shield consisting of light water surrounding said fast neutron shield.

6. A neutron source according to claim 1 wherein said shell of depleted uranium dioxide includes a magnesium window provided with a depleted uranium dioxide shutter for each collimator.

7. A neutron source according to claim 1 and including semicylindrical reflectors of zirconium hydride on the outside of the guide tubes away from the flux trap at the elevation of the flux trap and zirconium hydride reflector plates disposed in the vessel above and below the flux trap.

8. A neutron source according to claim 1 wherein there are five guide tubes distributed around the flux trap in a pentagonal pattern and each source of neutrons contains 2 milligrams of californium-252.

9. A neutron source according to claim 1 wherein the collimating means consist of two horizontal and one vertical collimators arranged orthogonally.

10. A neutron source which is particularly useful for neutron radiography comprising a vessel containing mineral oil, a dewar vessel containing heavy water constituting a flux trap disposed at the center of said vessel, a shell of depleted uranium dioxide having three orthogonally located windows therein provided with depleted uranium dioxide shutters surrounding the dewar vessel, five vertically disposed guide tubes arranged around the dewar vessel in a pentagonal pattern, a source of neutrons consiting of a capsul containing 2 milligrams of californium-252 in each guide tube, neutron shields surrounding the lower portions of the guide tubes, means for moving the capsules of californium-252 between a position within the guide tube neutron shields and a position adjacent the flux trap, collimator means defining a neutron beam path from each of said windows in said depleted uranium dioxide shell to the exterior of the neutron source, semicylindrical reflectors of zirconium hydride on the outside of the guide tubes away from the flux trap at the elevation of the flux trap, zirconium hydride reflector plates disposed in the vessel above and below the flux trap, a metal block provided with a depending metal finger fastened to the dewar vessel, a casing surrounding said metal block and metal finger, an electrical heating coil wound around the metal finger, means for introducing and removing a liquefied gas to the interior of said casing, a fast neutron shield consisting of water poisoned with gadolinium oxide surrounding said vessel, and a biological shield consisting of water surrounding said fast neutron shield.

* * * * *